US006369826B1

(12) United States Patent
Shimotono et al.

(10) Patent No.: US 6,369,826 B1
(45) Date of Patent: Apr. 9, 2002

(54) COMPUTER, OVERLAY PROCESSOR AND METHOD FOR PERFORMING OVERLAY PROCESSING

(75) Inventors: Susumu Shimotono, Hadano; Toru Aihara, Yokohama; Sanehiro Furuichi, Kawasaki, all of (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/347,576

(22) Filed: Jul. 6, 1999

(30) Foreign Application Priority Data

Jul. 21, 1998 (JP) ............................................ 10-204610

(51) Int. Cl.$^7$ ................................................ G06T 11/40
(52) U.S. Cl. ........................ 345/589; 345/548; 345/549
(58) Field of Search ................................. 345/431, 154, 345/153, 327, 339, 474, 302, 117, 121, 328, 113–116, 589, 783, 764, 548, 549, 547, 22; 348/97, 102, 577, 592, 584, 587, 591–596

(56) References Cited

U.S. PATENT DOCUMENTS

| 5,367,339 A | * 11/1994 | Lippincott ................... 348/592 |
| 5,412,479 A | * 5/1995 | Alig et al. ................... 348/594 |
| 5,426,729 A | * 6/1995 | Parker ........................ 345/441 |
| 5,500,684 A | * 3/1996 | Uya ............................ 348/592 |
| 5,583,536 A | 12/1996 | Cahill, III |
| 5,587,723 A | * 12/1996 | Otake et al. ................. 345/118 |
| 5,592,236 A | 1/1997 | Rosenbaum et al. |
| 5,598,525 A | * 1/1997 | Nally et al. .................. 345/546 |
| 5,621,428 A | * 4/1997 | King et al. .................. 345/118 |
| 5,696,527 A | 12/1997 | King et al. |
| 5,708,479 A | * 1/1998 | Gehrmann ................... 348/587 |
| 5,737,031 A | * 4/1998 | Tzidon et al. ............... 348/587 |
| 5,812,214 A | * 9/1998 | Miller ........................ 348/587 |
| 5,889,564 A | * 3/1999 | Tsukagoshi .................. 348/594 |
| 5,923,381 A | * 7/1999 | Demay et al. ............... 348/592 |
| 6,023,302 A | * 2/2000 | MacInnis et al. ............ 348/597 |
| 6,122,013 A | * 9/2000 | Tamir et al. ................. 348/587 |

FOREIGN PATENT DOCUMENTS

| JP | 7-222191 | 8/1995 |
| JP | 9-127917 | 5/1997 |
| JP | 9-325715 | 12/1997 |

* cited by examiner

Primary Examiner—Michael Razavi
Assistant Examiner—Thu-Thao Havan
(74) Attorney, Agent, or Firm—McGinn & Gibb, PLLC

(57) ABSTRACT

To enable a moving image to be clearly displayed on a hold-type of a display, such as a liquid crystal display, by setting a shutter function in an overlay processor, a computer having a display for displaying a moving image includes a memory with an on-screen area for storing display image information and an off-screen area for storing image information of the moving image. The on-screen area includes a memory area used as a display area of the moving image and which stores predetermined key color information. A data reading circuit reads the display image information from the on-screen area and the image information of the moving image from the off-screen area, and a shutter circuit outputs the image information of the moving image from the data reading circuit or predetermined color information by a predetermined frame. A key color detecting circuit determines whether the read display image information is the key color information or not, and a selector circuit outputs an image signal corresponding to the display image information to the display if the read display image information is not the key color information, and outputting a signal corresponding to an output of the shutter circuit to the display if the read display image information is the key color information.

16 Claims, 7 Drawing Sheets

SYNTHESIS

OVERLAY PROCESSING

COMPUTER, OVERLAY PROCESSOR AND METHOD FOR PERFORMING OVERLAY PROCESSING

BACKGROUND OF THE INVENTION

1. Field of the Invention

The present invention relates to a method and apparatus for displaying a moving image on a display device.

2. Description of the Related Art

If a display has a memory function and light is emitted at a relatively stable brightness, since a pixel on the display surface emits light until the memory of the pixel is rewritten with new image information of a next frame, the display is called a "hold-type" of a display. Such a hold-type of a display includes a liquid crystal display (LCD).

However, conventionally a hold-type display has well known shortcomings and failings such as blurred contours and jerkiness wherein movements become "jerky" (e.g., abrupt) when a moving image is displayed on a hold-type of a display (e.g., see pp. 19 to 26 of Shingaku Gihou EID96-4 (1996-06)).

In the article referenced above, it is shown that these error conditions are improved by using a shutter function of 50 percent or less than that of an aperture rate. The shutter in the article is referred to as a display shutter while its details are not described.

Further, Japanese Published Unexamined Patent Application No. Hei 9-325715 discloses that a shutter using polymer dispersed liquid crystal (LC) and a ferroelectric LC is set between a display and a user.

Additionally, when displaying a moving image on a personal computer, high speed processing is achieved by using a graphic device with a hardware overlay function (e.g., see U.S. Pat. No. 5,696,527, U.S. Pat. No. 5,592,236, and U.S. Pat. No. 5,583,536). However, there is no instance wherein a combination of an overlay function and the above-mentioned shutter function is considered.

SUMMARY OF THE INVENTION

In view of the foregoing and other problems of the conventional method and structures, it is, therefore, an object of the present invention is to enable a moving image to be clearly displayed on a hold-type of a display, such as an LCD, by setting a shutter function in an overlay processor.

In a first aspect of the present invention, a computer which has a display device for displaying a moving image, includes a memory with an on-screen area for storing display image information and an off-screen area for storing image information of the moving image. The on-screen area includes a memory section area used as a display area for the moving image and for storing predetermined key color information (e.g., a color used infrequently, such as a very dark blue, almost black, etc.).

The computer further includes a data reading circuit (a video RAM (VRAM) reading circuit 301) for reading the display image information from the on-screen area and the image information of the moving image from the off-screen area. A shutter circuit is provided for outputting the image information of the moving image from the data reading circuit or predetermined color information (e.g., black) by a predetermined frame cycle (for instance, for each frame). A key color detecting circuit is provided for determining whether or not the read display image information is key color information. A selector circuit is provided for outputting to the display, an image signal corresponding to the display image information if the read display image information is not the key color information, or for outputting a signal corresponding to an output of the shutter circuit if the read display image information is the key color information.

The combination of these features will have the same effect as having a shutter function of 50 percent or less than that of an aperture rate because black or image information of a moving image is displayed being switched for each frame in an area of the screen displaying the moving image.

With this arrangement, by setting a shutter function in an overlay processor, a moving image can be displayed clearly on a hold-type of a display such as a liquid crystal display.

The present disclosure relates to subject matter contained in Japanese Published Unexamined Patent Application No. Hei 10-204610, filed Jul. 21, 1998, which is expressly incorporated herein by reference in its entirety.

BRIEF DESCRIPTION OF THE DRAWINGS

The foregoing and other objects, aspects and advantages will be better understood from the following detailed description of preferred embodiments of the invention with reference to the drawings, in which.

DETAILED DESCRIPTION OF PREFERRED EMBODIMENTS OF THE INVENTION

Figure 1:
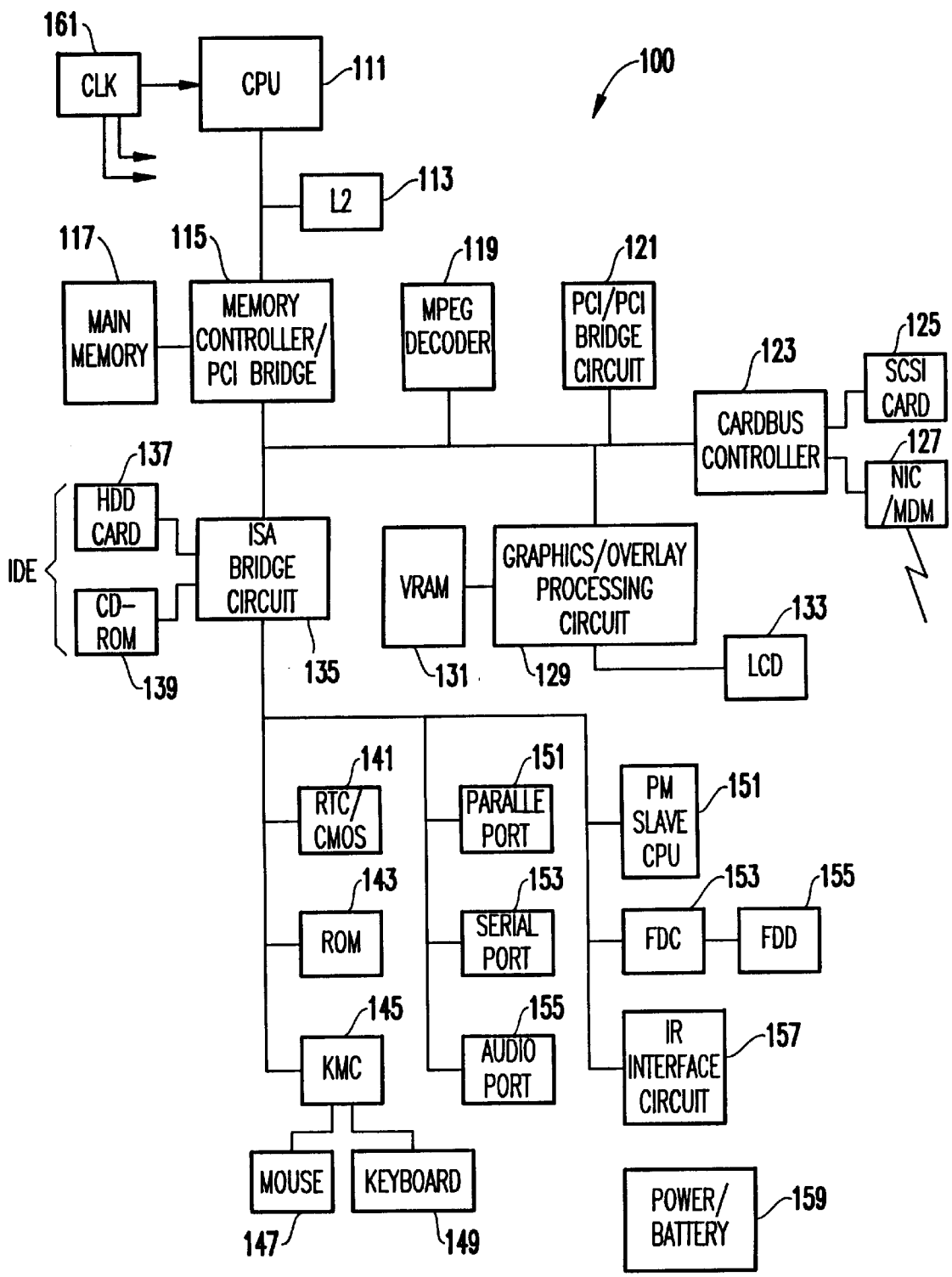
FIG. 1 is a functional block diagram showing an exemplary hardware arrangement for a computer with an overlay processor according to the present invention.

Referring now to the drawings, and more particularly to FIGS. 1–7, there are shown preferred embodiments of the method and structures according to the present invention.

In an exemplary embodiment, FIG. 1 illustrates a computer 100 comprising a CPU 111 connected to an L2 cache 113 and a memory controller/PCI bridge 115. A clock CLK 161 is connected to the CPU 111 and also to other circuits.

The memory controller/PCI bridge 115 is connected to a PCI bus and main memory 117. Connected to the PCI bus are a MPEG decoder 119, a PCI/PCI bridge circuit 121, a cardbus controller 123, a graphics/overlay processing circuit 129, and an ISA bridge circuit 135.

The ISA bridge circuit 135 is connected to an ISA bus (unreferenced), an IDE hard disk drive (HDD) 137, and a CD-ROM drive 139.

The ISA bus, to which the ISA bridge circuit 135 is connected, is additionally connected to various circuits including a real time clock (RTC)/CMOS 141 and an IR interface circuit 157. Other feature expansion circuits or cards may also be connected.

The computer 100 further includes a keyboard mouse controller KMC 145, a floppy disk drive controller FDC 153, and a PM (power management) slave CPU 151 which performs various control functions, for example power control for various devices as well as the entire system including on-off control of an LED. The power from a power/battery 159 is supplied to each device through power lines which are not illustrated.

As shown in FIG. 1, a SCSI card 125 and a network interface card (NIC)/modem (MDM) 127 are connected to the cardbus controller 123. Other feature expansion cards (not shown) may also be connected.

An important aspect of the invention is the combination of the graphics/overlay processing circuit 129, the VRAM 131, and the connecting liquid crystal display (LCD) 133. Additionally, a moving image may also be captured from a DVD by connecting a DVD drive to the SCSI card 125.

Figure 2:
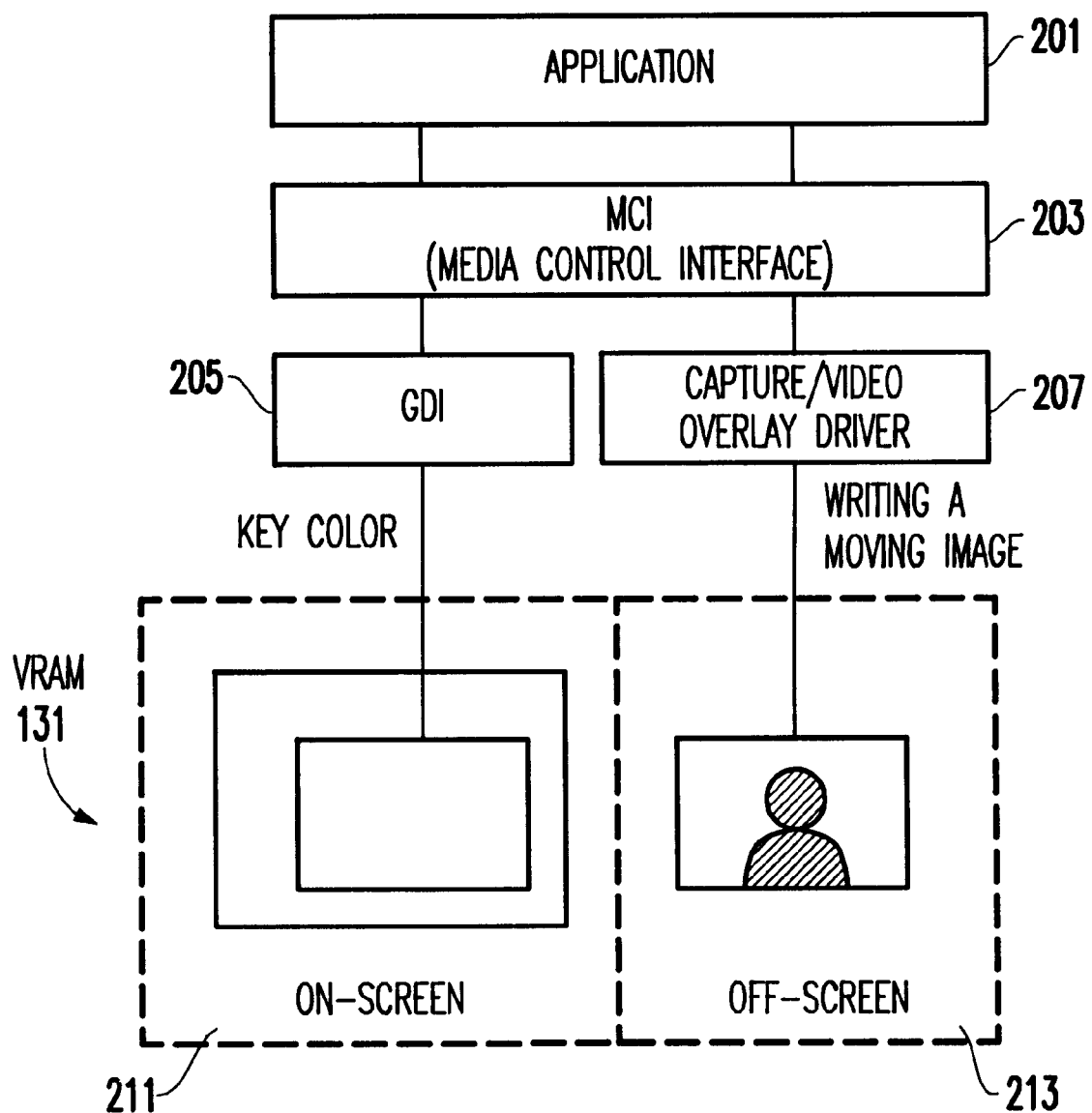
FIG. 2 is a diagram for showing an exemplary software structure according to the present invention.

FIG. 2 illustrates an operation of the computer 100 in FIG. 1, and particularly the part related to a display of a moving image. Herein below, is described an example of application 201 performing a replay of a moving image via the MCI (media control interface) 203 which uses a capture/video overlay driver 207.

Upon receiving a request for an overlay display from an application 201, the media control interface (MCI) 203 first reserves, in an on-screen area 211, a memory area for storing display data. The on-screen area 211 includes a section filled with a key color via a GDI (graphics device interface) 205. The GDI (graphics device interface) 205 is responsible for the ordinary display of on-screen area 211 of the VRAM (video RAM) 131.

Preferably, a color infrequently used, such as a very dark blue approaching black, may be selected as a key color. Of course, any color could be selected based on the designer's constraints and requirements.

Next, a section (area) is reserved in off-screen area 213 by capture/video overlay driver 207 for displaying a moving image. Thereafter, MCI 203 controls (ensures) that the area storing the key color in on-screen area 211 and the area reserved on off-screen area 213 are of the same size. When this initialization check is completed, processing necessary for a moving image display begins, as described below.

In response to a rewriting request, from application 201 to MCI 203, for moving image data for each moving image frame, the moving image data at off-screen area 213 is regularly updated by the capture/video overlay driver 207.

The original data, for updating purposes, may also be obtained from CD-ROM drive 139 or a remote server via a NIC/MDM card 127. Further, an NTSC signal may be used from TV or VCR (video cassette recorder) converted from analog-to-digital and captured in a capture circuit (not illustrated) and used via the capture/video overlay driver.

Figure 3:
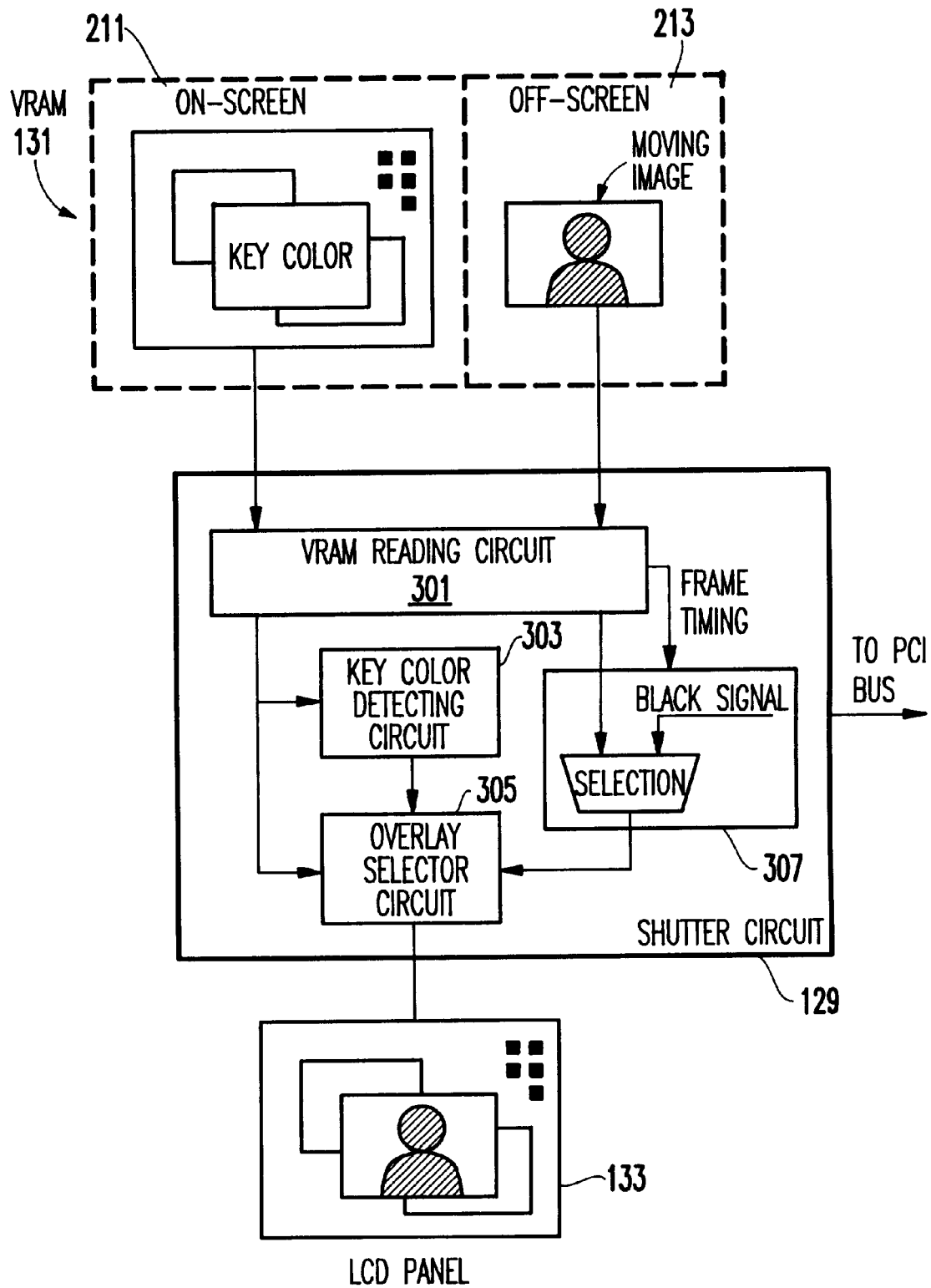
FIG. 3 is a functional block diagram showing an exemplary graphics/overlay processing circuit 129 according to the present invention.

Referring to FIG. 3, moving image data is displayed on LCD 133 with the image information in on-screen area 211 and the moving image data in the off-screen area 213. FIG. 3 illustrates the processing after the data to be displayed in VRAM 131 is provided.

When rewriting moving image data into off-screen area 213, an MPEG decoder 119, shown in FIG. 1 may be used. If the VRAM 131 has, for example, a capacity of 4 MBytes and a screen size of 1024×768 pixels displayed in 16-bit color, then on-screen area 211 is approximately 1.6 MBytes, and in the off-screen area 213, 720 Kbytes are reserved for moving image data of 600×400 pixels and 24-bit color.

VRAM 131 is logically divided into off-screen area 213 and on-screen area 211. Furthermore, for the structure described above, it is already included as a part of the OS (operating system) in Microsoft® products such as Windows 95® (trademark of Microsoft Corp.). Alternatively, a corresponding driver (MPEG decoder) may be easily included.

Application 201 can write moving image data regardless of the contents of on-screen area 211. Additionally, it does not consider differences in the maximum number of colors or the color format (RGB or YUV) of image data. Such automatic color space conversion (e.g.,YUV to RGB) are conventionally included in an overlay function, so the following explanation does not refer to it.

FIG. 3 is a detailed block diagram of VRAM 131 and capture/graphics processing circuit 129. The capture/graphics processing circuit 129 includes VRAM reading circuit 301, key color detecting circuit 303, overlay selector circuit 305 and shutter circuit 307.

The VRAM reading circuit 301 outputs image data read from on-screen area 211 to key color detecting circuit 303 and overlay selector circuit 305. Moving image data read from off-screen area 213 is output to shutter circuit 307.

The VRAM reading circuit 301 also provides a frame timing signal to shutter circuit 307. The frame timing signal can be generated one pulse per frame cycle.

The shutter circuit 307 selects, either moving image data from the VRAM reading circuit 301, or a black (e.g., predetermined color) signal and outputs it to overlay selector circuit 305. The selection by shutter circuit 307 is discussed below.

The key color detecting circuit 303 detects a key color stored in the moving image area reserved in on-screen area 211 and outputs the detected signal to overlay selector circuit 305. The output from overlay selector circuit 305 is supplied to LCD panel 129.

Operation of the functional blocks in FIG. 3 is explained herein below. VRAM reading circuit 301 reads image data and moving image data from on-screen area 211 and off-screen area 213 following a horizontal scan line at frame frequency of 60 Hz, for instance, and outputs them to the key color detecting circuit 303 and overlay selector circuit 305.

At a time when the horizontal scan line of VRAM reading circuit 301 approaches an area within on-screen area 211 storing a key color, the key color detecting circuit 303 outputs a detection signal to overlay selector circuit 305. The overlay selector circuit 305 is alerted that the horizontal scan line is nearing a key color area, and replaces the key color area of on-screen area 211 with the moving image data of off-screen area 213.

Consequently, the moving image data on off-screen area 213 overlaps the key color area in on-screen area 211.

Shutter circuit 307, having received a frame timing signal from the VRAM reading circuit 301, determines whether a black signal or the moving image data received from VRAM reading circuit 301 should be output in this frame based on a predetermined frame cycle.

For example, if a black signal is to be output to overlay selector circuit 305 for one frame period in two frames, since the moving image data from VRAM reading circuit 301 was output to overlay selector circuit 305 in the first frame cycle in the foregoing explanation, it is switched after receiving a frame timing signal next so that a black signal is output to overlay selector circuit 305.

Consequently, the area for displaying the moving image once in two times (e.g., every other time) is painted black as if it is shuttered, thereby allowing a 50 percent aperture rate to be attained. It also becomes possible to faithfully display a moving image for which rewriting occurs a maximum of 30 times per second.

FIGS. 4a–4f and 5a–5c illustrate conceptually the processing described above. As in FIG. 4(a), when the horizontal scan line in on-screen area 211 of VRAM reading circuit 301 is on the key color area, a signal as in FIG. 4(c) (e.g., a signal about blue (B) of RGB, etc.) is output to LCD panel 129 if the overlay selector circuit does not operate.

Alternatively and in a similar fashion, the moving image data on a horizontal scan line is read from off-screen area 213 and also stored in a RGB format. If the moving image data on the horizontal scan line is converted to a signal, as shown in FIG. 4(c), the signal becomes that shown in 4(d).

Figure 4A:
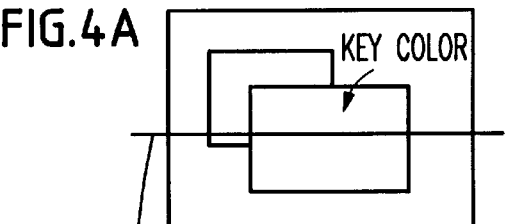
FIGS. 4a–4f are diagrams showing the processing of a the graphics/overlay processing circuit 129.
Figure 4B:
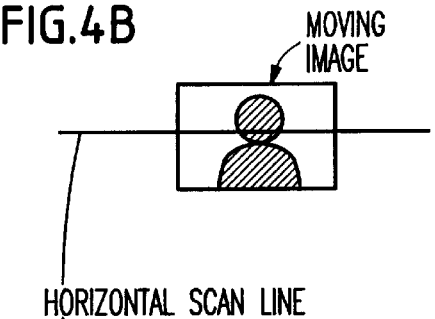
Figure 4C:
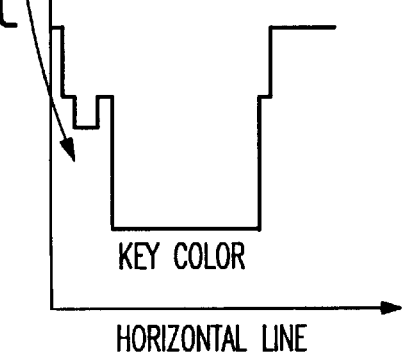
Figure 4D:
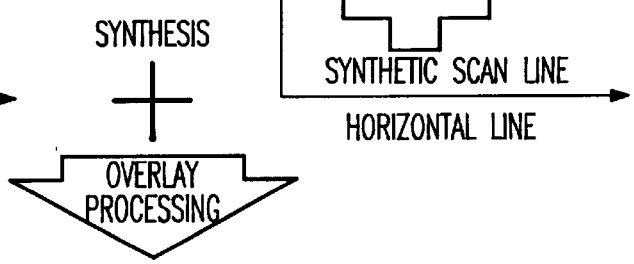
Figure 4E:
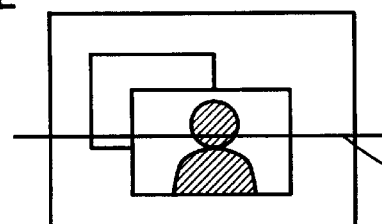
Figure 4F:
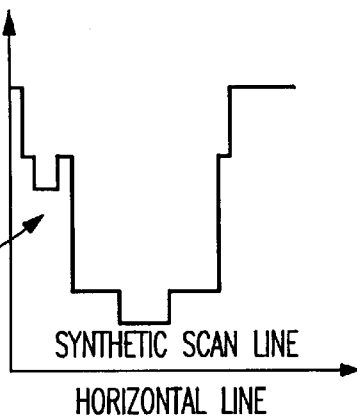

In overlay processing, the signal portion corresponding to the key color in FIG. 4(c) is replaced by a signal as shown in FIG. 4(d), and a signal as shown in FIG. 4(f) is generated in response to the horizontal scan line of FIG. 4(e). The result is a display, as shown in FIG. 4(e).

Figure 5A:
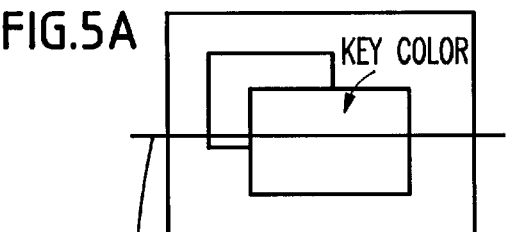
FIGS. 5a–5e are further diagrams showing the processing of the graphics/overlay processing circuit 129.
Figure 5B:
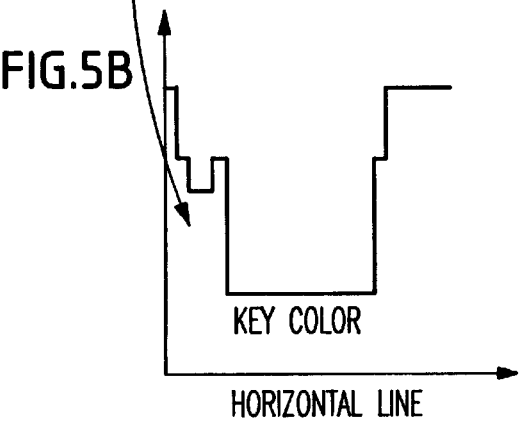
Figure 5C:
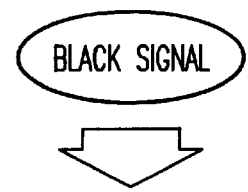
Figure 5D:
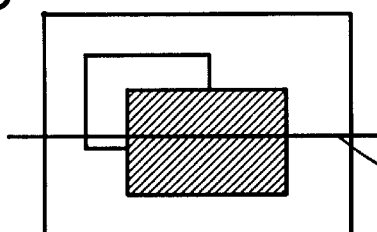
Figure 5E:
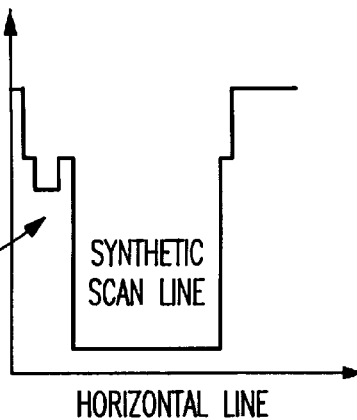

Alternatively, when it is shuttered (e.g., when shutter circuit 307 outputs a black signal), the signal corresponding to FIG. 4(d) becomes that as shown in FIG. 5(c). If overlay processing is performed, a display illustrated in FIG. 5(d) is produced and the signal corresponding to the horizontal scan line of FIG. 5(d) becomes a signal as that shown in FIG. 5(e) wherein the key color portion of FIG. 5(b) is replaced by a signal in FIG. 5(c).

Figure 6:
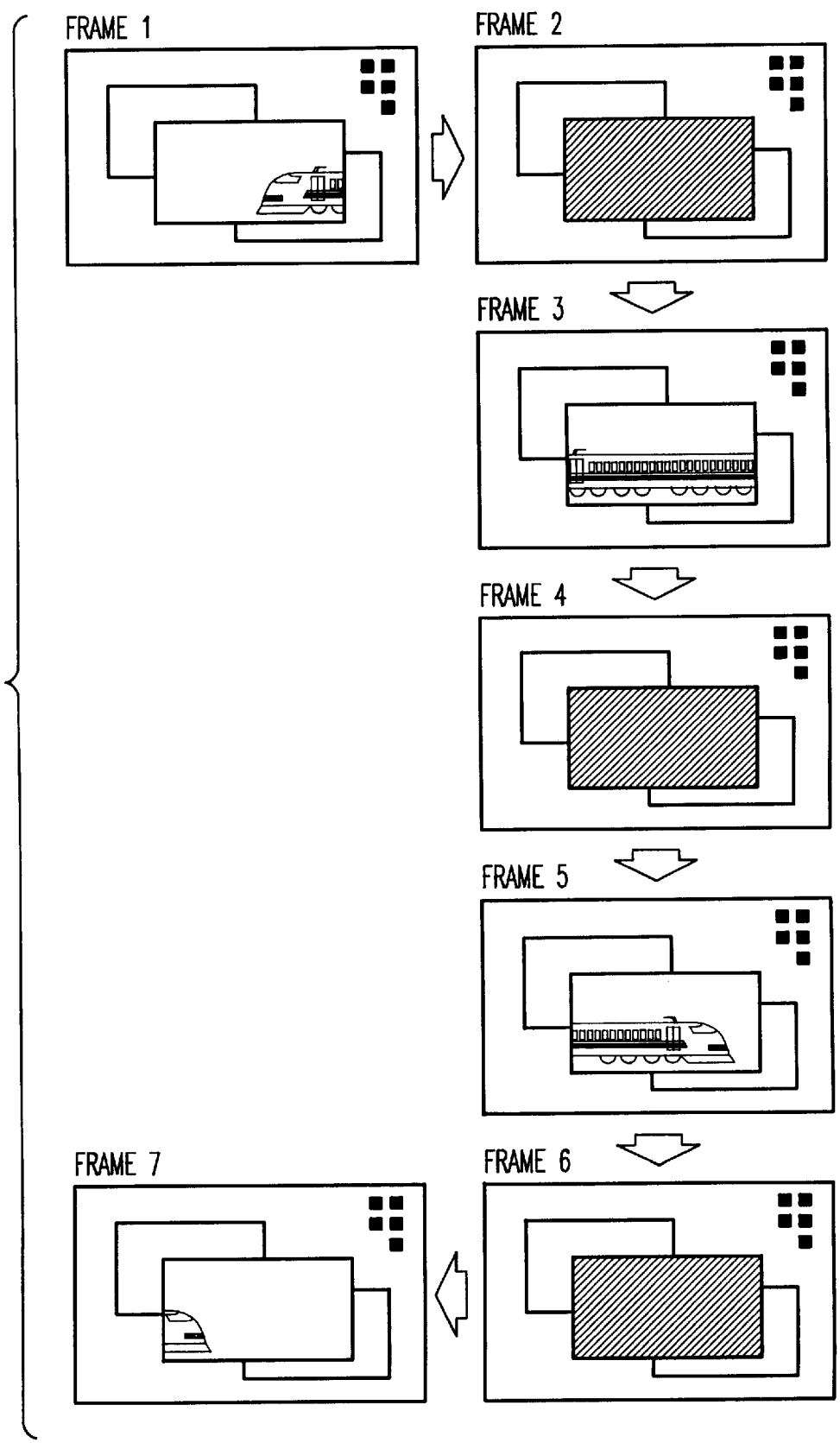
FIG. 6 is a diagram showing the frame processing of the graphics/overlay processing circuit 129.
Figure 7:
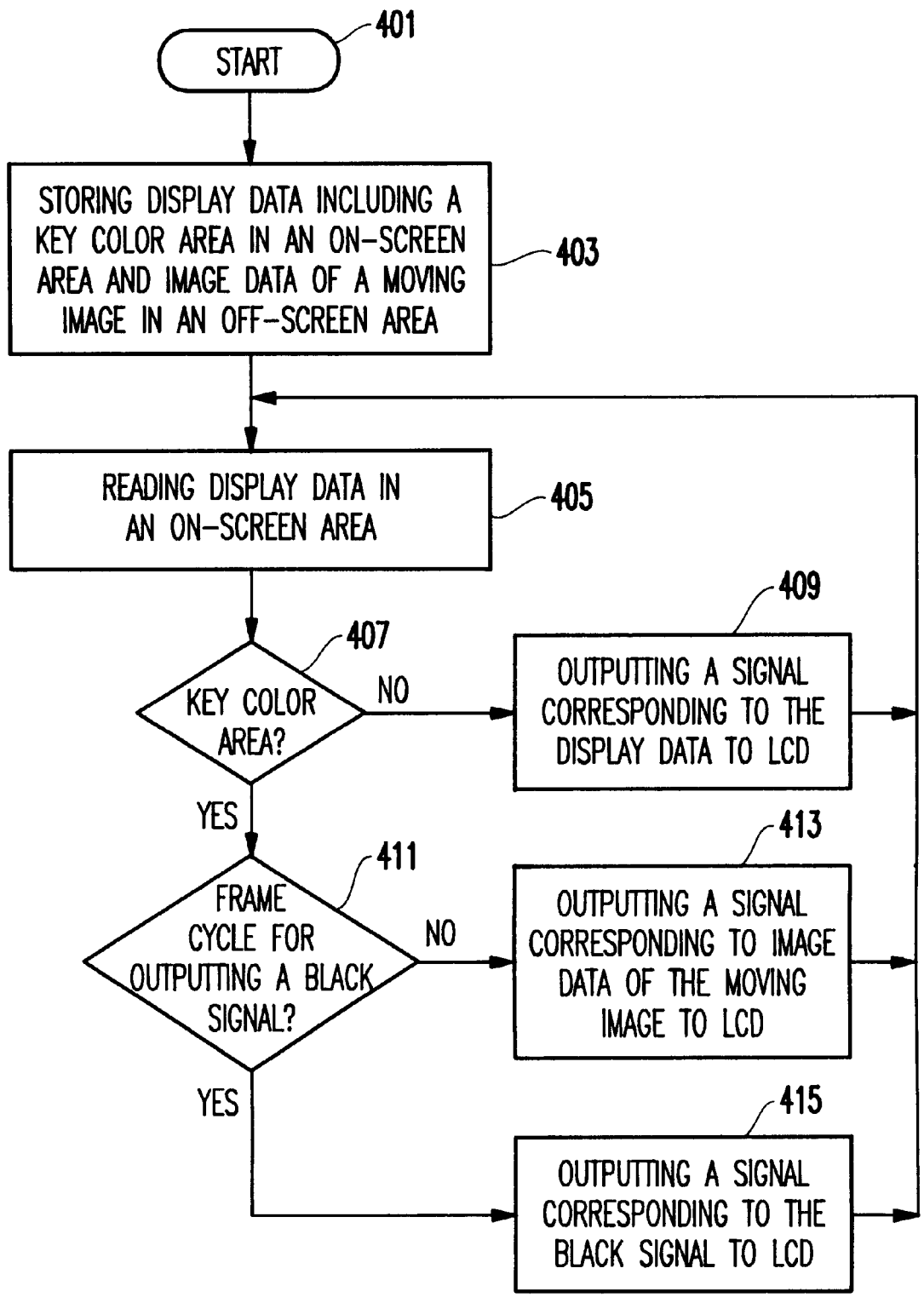
FIG. 7 is a flowchart showing the processing stages of the graphics/overlay processing circuit 129.

If every other frame timing signal (e.g., one every two times), the shutter circuit 305 selects a black signal and outputs the black signal to overlay selector circuit 305, then a black image is displayed in an area for a moving image every second time as shown in FIG. 6.

While a moving image is also displayed every second time, the contents of frames 1, 3, 5 and 7 are different in principle because it is a moving image.

The processing described above is summarized in FIG. 7. Display data, including the key color area, is stored in the on-screen area of VRAM 131, and image data of the moving image is stored in an off-screen area (step 403).

This process is performed repeatedly as required. Then, the display data in the on-screen area is read (e.g., step 405) and a determination is made as to whether it is a key color area or not (e.g., step 407). If it is not a key color area, then a signal corresponding to the display data is output to LCD 133 (e.g., step 409).

Display data may be either output as a digital signal or, subsequent to conversion, as an analog signal. If it is a key color area, then it is determined whether it is a frame cycle for outputting a black signal (step 411). If it is a frame cycle for outputting a black signal, then a signal corresponding to the black signal is output to LCD 133.

Alternatively, if it is a frame cycle not corresponding to the output of a black signal, then an image signal corresponding to image data of the moving image is output to LCD 133 (step 413). Steps 405 through step 415 are performed every time the display data stored in the on-screen area is read.

In addition to the embodiment described above, there are other variations that could be formulated.

For instance, the configuration of the computer 100 is not limited to that shown in FIG. 1, but may encompass the addition or elimination of functions as defined by a user.

A graphics processing circuit and an overlay processing circuit may be separated respectively and paired with corresponding on-screen and off-screen memories. In this case, overlay selector circuit 305 would exist either by itself or would be built into one of the memories. The image data generated over both circuits (the overlay processing circuit and graphics processing circuit) would be appropriately synthesized to create the final output.

In addition, although an example of outputting a black signal for one frame period in two frames is shown, the present invention is not limited to this configuration. For instance, it is also possible to output image data of a moving image for two consecutive frames and output a black signal for two consecutive frames. Other possibilities would similarly be known by one of ordinary skill taking the present application as a whole.

Indeed, it is also possible in an 8-frame cycle to output image data of a moving image for four consecutive frames and output a black signal for four consecutive frames. However, when a consecutive output becomes too long, flickers become conspicuous and image quality deteriorates conversely. Assuming 60 frames per second, four frames equal 1/15 (4×1/60) sec., which will result in flickers.

Also, since it is effective at 50 percent or less of an aperture rate, a transformation such as outputting a black signal for two of three frame periods is possible, thereby not limiting the configuration to a 50 percent aperture rate.

However, if the aperture rate is lowered, the screen may become darker with a lessened aperture rate and image data of a moving image is updated less often.

Furthermore, it is also possible to perform switching as above with an even more complex frame pattern.

While the invention has been described in terms of a preferred embodiment, those skilled in the art will recognize that the invention can be practiced with modification within the spirit and scope of the appended.

Having thus described our invention, what we claim as new and desire to secure by Letters Patent is as follows:

1. A computer for displaying a moving image on a display, comprising:
   a memory including an on-screen area for storing display image information and an off-screen area for storing image information of said moving image, said on-screen area including a memory area for displaying said moving image and for storing key color information;
   a data reading circuit for reading said display image information from said on-screen area and said image information of said moving image from said off-screen area;
   a shutter circuit for outputting said image information of said moving image from said data reading circuit or predetermined color information by a predetermined frame cycle;
   a key color detecting circuit for determining whether read display image information comprises said key color information; and
   a selector circuit for outputting all image signal corresponding to said display image information to said display when the read display image information is determined not to comprise said key color information, and outputting a signal corresponding to an output of said shutter circuit to said display if the read display image information is determined to comprise said key color information,
      wherein said predetermined color information output in successive frames of said predetermined frame cycle is the same color.

2. The computer according to claim 1, wherein said predetermined color information is black.

3. The computer according to claim 1, wherein said predetermined frame cycle is for each one frame period.

4. The computer as claimed in claim 1, wherein said moving image information is output for two consecutive frames and said predetermined key color information is output for two consecutive frames.

5. The computer as claimed in claim 1, wherein said display image information is output as one of a digital signal and an analog signal.

6. The computer as claimed in claim 1, wherein an area of said on-screen area storing said pre-determined color information and an area of said on-screen area storing a moving image have the same size.

7. The computer as claimed in claim 1, wherein said shutter circuit creates video data of said predetermined color information for said selector circuit and inserts said video data into a video data stream by said predetermined frame cycle.

8. An overlay processor comprising:
  a memory having an on-screen area and an off-screen area;
  a data reading circuit for reading display image information from the on-screen area of the memory and image information of a moving image from the off-screen area of said memory, said on-screen area for storing said display image information and said off-screen area for storing said image information of said moving image, said on-screen area including a memory area which is kept for a display area of said moving image and which stores key color information;
  a shutter circuit for outputting said image information of said moving image from said data reading circuit or predetermined color information by a predetermined frame cycle;
  a key color detecting circuit for determining whether the read display image information comprises said key color information; and
  a selector circuit for outputting an image signal corresponding to said display image information to said display if the read display image information is determined not to comprise said key color information, and for outputting a signal corresponding to an output of said shutter circuit to said display if the read display image information is determined to comprise said key color information,
    wherein said predetermined color information output in successive frames of said predetermined frame cycle is the same color.

9. An overlay processor as claimed in claim 8, wherein said shutter circuit creates video data of said predetermined color information for said selector circuit and inserts said video data into a video data stream by said predetermined frame cycle.

10. A method for performing overlay processing on a computer which has a memory including an on-screen area for storing display image information and an off-screen area for storing image information of a moving image, and a display, wherein said on-screen area includes a memory area which is kept for a display area of said moving image and which stores key color information, said method comprising:
  reading said display image information from said on-screen area;
  determining whether the read display image information comprises said key color information;
  if said determining indicates that the read display image information does not comprise said key color information, outputting an image signal corresponding to said display image information to said display;
  if said determining indicates that the read display image information comprises said key color information, determining a frame period in which predetermined color information should be output;
  if said predetermined color information is to be output, outputting a signal corresponding to said predetermined color information to said display; and
  if said predetermined color information is not output, outputting a signal corresponding to image information of said moving image read from said off-screen area to said display,
    wherein said predetermined color information to be output is the same color.

11. The method for performing overlay processing as claimed in claim 10, wherein said outputting a signal corresponding to said predetermined color information to said display includes creating video data of said predetermined color information and inserting said video data into a video data stream by said frame period.

12. A computer for displaying a moving image on a display, comprising:
  a memory for storing display image information in an on-screen area and for storing image information of said moving image in an off-screen area, said on-screen area including a memory area which is kept for a display area of said moving image and which stores predetermined first color information;
  a data reading circuit for reading said display image information from said on-screen area and said image information of said moving image from said off-screen area;
  a shutter circuit for outputting said image information of said moving image from said data reading circuit or predetermined second color information by a predetermined frame cycle;
  a key color detecting circuit for determining whether said read display image information comprises said predetermined first color information; and
  a selector circuit for outputting an image signal corresponding to said display image information to said display if said read display image information is determined not to comprise said predetermined first color information, and outputting a signal corresponding to an output of said shutter circuit to said display if said read display image information is determined to comprise said predetermined first color information,
    wherein said predetermined second color information output in successive frames of said predetermined frame cycle is the same color.

13. The computer as claimed in claim 12, wherein said shutter circuit outputs a frame timing signal which is generated one pulse per frame.

14. The computer as claimed in claim 12, wherein said shutter circuit receives a frame timing signal from said data reading circuit and determines whether said predetermined second color information or said image information of said moving image should be output based on the predetermined frame cycle.

15. The computer as claimed in claim 14, wherein said color signal is output for every one frame of two frames.

16. A computer as claimed in claim 12, wherein said shutter circuit creates video data of said predetermined second color information for said selector circuit and inserts said video data into a video data stream by said predetermined frame cycle.

\* \* \* \* \*